United States Patent
Stapfer

(10) Patent No.: US 10,854,030 B2
(45) Date of Patent: Dec. 1, 2020

(54) METHOD, DEVICE AND SYSTEM FOR HANDLING A TRANSPORT CONTAINER FOR VALUABLE OBJECTS

(71) Applicant: GIESECKE+DEVRIENT CURRENCY TECHNOLOGY GMBH, Munich (DE)

(72) Inventor: Michael Stapfer, Neubiberg (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 56 days.

(21) Appl. No.: 16/331,310

(22) PCT Filed: Sep. 1, 2017

(86) PCT No.: PCT/EP2017/001040
§ 371 (c)(1),
(2) Date: Mar. 7, 2019

(87) PCT Pub. No.: WO2018/046122
PCT Pub. Date: Mar. 15, 2018

(65) Prior Publication Data
US 2019/0355201 A1 Nov. 21, 2019

(30) Foreign Application Priority Data
Sep. 7, 2016 (DE) .................. 10 2016 010 850

(51) Int. Cl.
*G07D 11/23* (2019.01)
*G01N 23/04* (2018.01)
(Continued)

(52) U.S. Cl.
CPC ............ *G07D 11/23* (2019.01); *G01N 21/84* (2013.01); *G01N 23/04* (2013.01); *G01N 23/083* (2013.01);
(Continued)

(58) Field of Classification Search
CPC .......... G07D 11/23; G07D 11/12–135; G07D 2207/00; G01N 21/84; G01N 23/04;
(Continued)

(56) References Cited

U.S. PATENT DOCUMENTS

| 5,090,573 A | 2/1992 | Takahashi et al. |
| 2011/0286822 A1 | 11/2011 | Bradley et al. |
| 2017/0158369 A1 | 6/2017 | Dopfer et al. |

FOREIGN PATENT DOCUMENTS

| DE | 4010813 A1 | 10/1990 | |
| DE | 3931176 A1 * | 3/1991 | ............. B65B 69/00 |

(Continued)

OTHER PUBLICATIONS

German Search Report from DE Application No. 102016010850.9, dated May 8, 2017.
(Continued)

*Primary Examiner* — Casey L Kretzer
(74) *Attorney, Agent, or Firm* — Workman Nydegger

(57) ABSTRACT

A method, an apparatus and a system relate to processing a transport container for objects of value, particularly value documents, such as for example banknotes. The method comprises the steps of feeding the transport container to an apparatus for processing the transport container, opening the transport container in the apparatus, emptying the objects of value from the transport container, and checking the transport container for a residual quantity. For the check, electromagnetic radiation is applied to the transport container, wherein a transmission image of the transport container is produced by means of the electromagnetic radiation. The residual quantity in the transport container is deduced by means of the analysis of the transmission image.

14 Claims, 5 Drawing Sheets

(51) Int. Cl.
　　　*G01N 23/083*　　(2018.01)
　　　*G01N 21/84*　　(2006.01)
(52) U.S. Cl.
　　　CPC ... *G01N 2223/639* (2013.01); *G07D 2207/00* (2013.01)
(58) Field of Classification Search
　　　CPC ...... G01N 23/06–083; G01N 2223/639; B65B 69/0033; B65B 69/0008
　　　See application file for complete search history.

(56) References Cited

FOREIGN PATENT DOCUMENTS

| | | | |
|---|---|---|---|
| DE | 102014008607 A1 | 12/2015 | |
| JP | 2013164362 A * | 8/2013 | ............. G01N 21/90 |
| WO | 2004059585 A1 | 7/2004 | |
| WO | 2011110973 A2 | 9/2011 | |

OTHER PUBLICATIONS

International Search Report from PCT Application No. PCT/EP2017/001040, dated Dec. 1, 2017.

* cited by examiner

METHOD, DEVICE AND SYSTEM FOR HANDLING A TRANSPORT CONTAINER FOR VALUABLE OBJECTS

BACKGROUND

The present invention relates to a method, an apparatus and a system for processing a transport container for objects of value.

As objects of value, in particular sheet-shaped value documents, such as, for example, banknotes, checks, tickets, value papers and/or vouchers, credit cards, cash cards, prepaid cards, coins, and other objects which represent an at least personal value.

A transport container serves in the present case for the preferably secure transport of objects of value. Various construction types are available for such transport containers. Usually, transport containers with rigid housings are available on the market, in which the objects of valuable, for example a bundle of banknotes, are arranged. Further, bag-shaped transport containers, so-called safebags, are common. Safebags disposable containers made of a plastic foil that are sealable all around. In the safebags, for the transport of the objects of value, for example from a supplier or depositor to a bank or a cash center, are filled in and the safebag is sealed.

The opening of such a transport container is currently usually carried out manually at the receiving location. In particular in the case of safebags, said pocket-shaped transport containers are opened on all sides with a knife or a pair of scissors. The objects of value contained in the transport container are removed manually and checked and sorted a banknote processing machine for further processing, in particular for checking for authenticity, fitness for circulation and/or denomination. After emptying the transport container, said container is archived for several weeks to prove complete emptying.

The workstation is usually monitored by a camera system due to the burden of proof that the content has been removed completely from the transport container and forwarded for further processing. It can occur here that parts of the transport container are concealed during the manual processing, so that no proof of complete emptying is possible.

SUMMARY

It is therefore the object of the invention to improve the current process of processing transport containers. In particular, it is the object of the invention to improve the check of the emptying of transport containers.

In a method for processing a transport container for objects of value, in particular value documents, the transport container is fed. The transport container is subsequently opened. After the transport container has been opened, the transport container is emptied. In a subsequent step, it is checked whether a residual quantity, i.e. a residual content, is present in the transport container. For this purpose, a transmission image is produced of the transport container, wherein the transport container is irradiated with electromagnetic radiation. In a further step, the transmission image is analyzed and examined for residual quantity. A residual quantity in the transport container can be deduced from the analysis.

With the present method, it is now possible to reliably check the transport container for residual quantity. From the transmission image, it can be determined reliably and automatically whether a residual quantity is still present in the transport container. The evaluation of the transmission image and the transmission image itself can be drawn on as proof of the complete emptying of the transport container, i.e. that no residual quantity is contained. Due to the automated analysis and assessment, even a continuously increasing video monitoring is no longer necessary. Due to the pictorial digital proof, the transport container no longer needs to be opened at least on three sides. The mere provision of an opening for removing the content would be sufficient. Thus, working steps can be saved in addition.

Irradiating the transport container with electromagnetic radiation and, in connection therewith, obtaining of a transmission image employs the advantages of a transillumination of the transport container. Corresponding to the applied spectrum, the focus can be placed on different materials and/or regions to be examined.

In order to check for residual quantity of the transport container, in a preferred embodiment, heat is applied to the transport container and an image in the infrared spectrum is recorded of the transport container. The transport container is preferably located between the radiation source and a sensor for recording the image. Due to different heat conduction properties and heat capacities of the transport container and its contents, the transport container can be examined. In particular, in the preferred arrangement, a transillumination of the transport container is possible. Value documents located in the transport container, for example, together with the material of the transport container emit a different heat radiation than the transport container in a region without value document. Moreover, the content itself can be deduced on the basis of the nature of the surface and material of the contents of the transport container.

Further, it would be conceivable to produce the transmission image with the aid of X-radiation. This means that the transport container is irradiated with X-rays. Due to the difference in density of the content in the transport container, the X-ray image (transmission image) thus created shows the content thereof clearly. A corresponding analysis of the transmission image clearly leads to a more precise statement regarding the residual quantity of the transport container.

In addition, the transport container could be subjected to or transilluminated by terahertz radiation. A coordinated sensor records the transmitting terahertz radiation through the transport container. A transmission image can be generated from the recorded values. Due to the property that materials are differently transmissive to terahertz radiation and, for example, metals are non-transmissive to terahertz radiation, specific objects can be ascertained in the transport container. For example, coins, but also objects coated with metal, such as, for example, an imprint on banknotes and/or a security strip could be detected.

In principle, each of the above-mentioned spectra could be employed on its own for producing the transmission image and thus for checking the transport container for residual quantity. In a particular embodiment, a combination of at least two of the spectra is used and two transmission images are generated.

Preferably, the transport container itself is transparent or approximately transparent to the spectrum employed. Thus, in order to analyze the content of the transport container, no filter and/or a contrast computation is necessary with regard to the representation thereof. The objects located in the interior of the transport container can be made visible easily. An evaluation as to whether and optionally which residual content or which residual quantity is present in the transport container is facilitated. The analysis by a machine or by a person can thus be carried out more easily.

In the analysis for residual quantity, it is checked according to the invention whether the transport container is considered as emptied. In particular, the result is intended to indicate that all of the objects of value transported as intended with regard to the transport container and/or the objects of value secured as intended by the transport container, for example banknotes, have been removed completely from the transport container. Here, it is preferably irrelevant whether further objects still remain in the transport container and this can be seen in the transmission image. In the assessment for remaining quantity, other objects which are not considered as objects of value would not be ascertained as a residual quantity.

In a particularly advantageous embodiment, it is provided that, when the check of the transport container for residual quantity yields that said container is considered as emptied, the transport container is disposed of. In particular, it can be provided that the transport container is comminuted, i.e. shredded and/or compressed to a specific, predetermined size. In particular in the case of a transport container made of a plastic or paper, this disposal represents a simple possibility to dispose of used transport container in a falsification-proof and irrevocable manner. In addition, the waste volume is reduced. In particular when transport containers are employed for security-relevant transports, such as monetary means, it can thus be prevented that a transport container is employed several times for different transports. The risk of falsification and thus the security factor with regard to a manipulation of the transport container is reduced.

In one embodiment, it can be provided that the transport container is reused, in particular recycled. A new identity can then be assigned to the transport container or the identity of the transport container and/or the transport container itself is retained for a defined time, until the transport container returns to circulation. For example, in the case of a transport container with a hard shell, in particular made of hard plastic and/or metal, so-called cash boxes, reuse is advantageous.

In a particularly preferred embodiment, the transport container is forwarded directly, i.e. without intermediate manual processing, for disposal and/or reuse, for example to a security container, which cannot be manually accessed at least until removal at the disposal facility and/or the reuse facility. Preferably, thus, for example, a transport container which is considered as emptied is forwarded directly for disposal, particularly preferably directly destroyed.

When the analysis yields that a residual quantity is still present in the transport container, the transport container is considered as not emptied. A further processing of the transport container, for example its disposal, is preferably to be avoided. The transport container is then considered as a reject. Preferably, the transport container is again at least emptied and checked for residual quantity. In this case, the transport container can be re-integrated into the method sequence as already explained. In one embodiment, a manual subsequent check and optionally manual emptying of the transport container, followed by a renewed check of the transport container for residual quantity by means of a transmission image, as described above, is conceivable.

In particular, in one embodiment, in the case of a reject, the transport container can be opened further. This is the case in particular when not at least three sides or walls of the transport container are opened, but merely one side or wall. The transport container can be opened further manually in this case. In particular, the transport container can already be re-integrated into the above-mentioned method sequence for the step of opening.

In a particularly preferred embodiment, an identification of the transport container is effected. The transport container has an identification element for this purpose. The identification element can be arranged as a label, imprint, inscription and/or as a card or slip of paper inside and/or outside the transport container. The identification element preferably has a machine-readable coding, which comprises at least information relating to the transport container, for example a unique identification, a sender, a recipient or destination, data relating to the content or the objects of value and/or the monetary amount of the objects of value. In order to identify the transport container, a sensor device preferably records the coding. The coding can provided in alphanumeric form, for example a sequence of numbers and/or letters, as a 1D code, for example as a bar code, as a 2D code, for example as a QR code or data matrix code and/or in another form. Alternatively or additionally, the transport container can be manually identified, for example by manually reading and entering into a system.

In a preferred embodiment, the transport container is identified before being opened and this is stored in a data processing system, for example in a database on a computer, in particular a server. Further, it can be provided that the transport container is identified again during the capture of the transmission image. For this purpose, the identification element can, for example, additionally be captured with light in the visual spectrum and/or the identification element can have the coding in an ink which is coordinated with the electromagnetic radiation for checking for residual quantity. The transport container would thus be identifiable in the transmission image.

In one embodiment variant, the produced transmission image is archived. The transmission image is preferably stored electronically, in particular in a database, in connection with the data set of the transport container. An electronic proof is thus present regarding the emptying of the transport container, in particular regarding whether a residual quantity is still present in the transport container. In comparison to the currently conventional method, the transport container itself no longer has to be physically archived or kept available. A processing station thus obtains the advantages of a smaller stock-keeping effort, higher traceability over the life cycle of the transport container, a higher level of security, a higher degree of automation and space saving.

In one embodiment, the transport container is arranged in a housing, in particular an apparatus for checking the transport container for residual quantity, during the irradiation with electromagnetic rays in order to produce the transmission image. The housing serves to shield against environmental influences, so that a preferably homogeneous defined ambient radiation is supplied for the capture of the transmission image. The housing has, on its inner wall, preferably an inner surface which is insulating and/or absorbent in accordance with the electromagnetic radiation. For example, when infrared radiation is employed, the housing could have a black inner surface with heat-insulating properties, for example from a material such as Styropor or Styrodur. In addition, the inner surfaces could emit a defined basic radiation, for example have a specific surface temperature. In particular, it could be provided that the inner surfaces are at least partially a radiation source of the electromagnetic rays which are drawn on to produce the transmission image.

In addition, in order to produce the transmission image of the transport containers, the transport container can be arranged in front of a background element that emits in accordance with the spectrum of the electromagnetic radiation, which background element can also be regarded as a transmitting unit. The transport container is arranged between the background element and a sensor unit for capturing the transmitting electromagnetic rays in the spectrum corresponding to the radiation of the background element. A homogeneous background radiation, which at the same time emits the transmitting radiation, can likewise be supplied with the background element. The background element is preferably part of the apparatus for checking the transport container for residual quantity. For example, the background element can be configured to be heat-radiating.

A defined background radiation can be supplied to the transport container both in the embodiment with the background element and with the housing, so that environmental influences can be reduced or excluded. Further, the analysis of the transmission image, in particular an edge detection and/or a processing of the transmission image by means of a filter and subsequent analysis, is facilitated. Reflections on the transport element from the ambient radiation are also prevented.

In a preferred embodiment, the transport container, provided it is configured in the manner of a bag, is checked for the presence of folds, in particular kinks and/or folded-over areas. This check can be carried out, for example, by means of surface scanning and/or a thickness measurement directed onto the material of the transport container. Optionally, a folding check with the aid of the transmission image would also be conceivable. The detection of existing folds allows reducing an erroneous interpretation of the analysis for residual quantity and/or an incorrect detection of a residual quantity.

In a preferred embodiment, a bag-type transport container is preferably smoothed or unfolded before the step of checking for residual quantity, at least before the application of electromagnetic radiation and production of the transmission image. For this purpose, an automatic mechanism, for example a brief shaking of the transport container, can be carried out. Further, ironing of the transport container would also be conceivable. In a preferred embodiment, the smoothing and/or unfolding of the transport container takes place in combination with the fold check, so that an unfolding and/or smoothing is effected only when folds are detected. In particular, folds can thus be removed in a spatially targeted manner.

An apparatus according to the invention for processing a transport container for objects of value, in particular value documents, such as for example banknotes, comprises a receiving device for receiving fed transport containers, a device for opening the transport container, a device for emptying the transport container and an apparatus for checking the transport container for a residual quantity. The apparatus for checking the transport container for residual quantity comprises a preferably optical sensor device for capturing a transmission image of the transport container. The apparatus further comprises an analysis unit for analyzing the transmission image for residual quantity.

The receiving device is to be understood in particular as an interface and/or transport apparatus for feeding the transport container to its processing. The receiving device can be an integral part of the apparatus for processing the transport container, but can also be present at a locally remote location. Preferably, it is the transfer point between logistics external to the apparatus for processing the transport container and logistics internal thereto.

The device for opening the transport container can be configured as a device for opening a specific mechanism of the transport container and can for example comprise a gripper and/or a pin which engages in an opening mechanism of the transport container. Further, the device can be configured for opening, in particular for severing or cutting open, the transport container. For example, the device for opening could be configured as a knife, in particular with negative pressure applied at the blade of the knife. The device for opening the transport container can be merely an object, such as a machine component, the knife or a pair of tongs and/or a workstation, at which the opening of the transport container is carried out.

The device for emptying the transport container can be configured in various ways. In particular, any configuration, both an automatic and/or manually assisted execution, are conceivable. For this purpose, the device can be a vibrator, collection container or stacking apparatus, for example for transport to a processing apparatus for objects of value. Further, it is also possible that only a workstation or a region thereof is considered and configured as the apparatus for emptying, in particular when the transport container is manually emptied and its content is to be stored.

The apparatus can be constructed from individual components. This means that the individual devices, such as the receiving device, the device for opening, the device for emptying and the apparatus for checking can be present in a modular manner at a workstation. Further, it would also be conceivable for at least two of the devices to be arranged in a common housing or to form a common housing.

Each of the devices can be configured to be executable manually, automatically or partially automatically. For example, the devices could be arranged around a workstation of an operator, wherein the operator merely executes a monitoring function. In addition, the apparatus could be configured in such a manner that the operator merely interferes manually in order to open the transport container and/or to empty it.

The apparatus for processing transport containers can be easily integrated into existing systems. In addition, a secure check of the transport containers for residual quantity is possible without increasing the security effort with regard to monitoring a workstation. Overall, the monitoring effort can be reduced.

The apparatus for checking the transport container for residual quantity preferably comprises a transmitting device for emitting electromagnetic radiation. The transmitting device preferably transmits light in an infrared spectrum, in a spectrum of X-radiation and/or in a spectrum of terahertz radiation onto the transport container. A sensor device for receiving the electromagnetic radiation is configured in accordance with the spectrum thereof. In particular, the arrangement of the transmitting device and the sensor device is such that the sensor device records the electromagnetic radiation which penetrates through the transport container. In a particular embodiment, the transmitting device is configured for emitting electromagnetic radiation in a different spectrum and the sensor device is configured to receive electromagnetic radiation in a different spectrum. The transmitting device and the sensor device can consist of several partial components for different spectra in each case.

In one embodiment, the apparatus for checking the transport container can comprise a housing and/or a background element, as already mentioned above. With the aid of the housing and/or the background element, a defined background radiation is supplied to the transport container for producing the transmission image. This allows an easier analysis of the transport container for residual quantity.

In one embodiment, the apparatus for processing the transport container can form a system. For example, the system can comprise a processing apparatus for processing the objects of value emptied from the transport container, in particular banknotes and/or coins; in one embodiment, the emptied objects of value are transported further directly to the processing apparatus for the further processing thereof. The processing apparatus is preferably configured for checking, counting and sorting the objects of value.

In a preferred embodiment, the apparatus for processing the transport container and optionally the processing apparatus are connected to a central computing unit, for example a server, via a data communication interface. The server preferably manages entries relating to the transport container in a manner similar to a database, in particular said transport container's identification, transmission image, preferably as image and/or raw data, process steps carried out, in particular in the case of classification as a reject, times and/or optionally an identification relating to an operator. Further, optionally and preferably, entries relating to the transport container are generated with respect to results and/or data of the processing apparatus. With such a configuration, traceability and thus also provability covering all steps and any access are possible at any time. The general security requirements can be reduced. For this purpose, keeping used security containers in stock at least for a limited period of time is no longer necessary. The database can also be a digital archive.

In a preferred embodiment, the system comprises a device for disposing of the transport container. The device can be configured to preferably comminute the transport container in a defined manner, for example a certain grain size and/or a certain dimension of shreds. The device can also be configured for compressing the transport container. Further, the device can also be configured for recycling the transport container. The device can reset the transport container, for example its identity and/or its entry or log-in in a goods transport system, so that the transport container can be reused, for example in the case of cash cassettes and/or cash boxes.

The device for disposal can be configured adjacent to or integrally with the apparatus for processing transport containers. In one embodiment, the device for disposal is remote from the apparatus for processing transport containers. For this purpose, an output of used transport containers by the apparatus for processing transport containers takes place for example to a security container, wherein the used transport containers are transported to the facility for disposal via the security containers. It is particularly preferred that manual access to the used transport containers is no longer possible from the device for checking for residual quantity.

In an advantageous system, transport containers are employed with a wall material comprising PE (polyethylene) at a wall thickness of 4-13 µm and/or PP (polypropylene) at a wall thickness of 7-13 µm, so that objects of value made of plastic can also be detected.

In principle, the method according to the invention and the apparatus according to the invention can also be combined with an analysis in visual light. Reflections can thus be captured in particular in the visual range and, for example, can be taken account of in a compensating manner in the transmission image of a different spectrum. Reflecting waves and/or folds are attenuated in the transmission image.

BRIEF DESCRIPTION OF THE DRAWINGS

The present invention will hereinafter be described by way of example with reference to the attached drawings. Therein are shown.

DETAILED DESCRIPTION OF VARIOUS EMBODIMENTS

Figure 1:
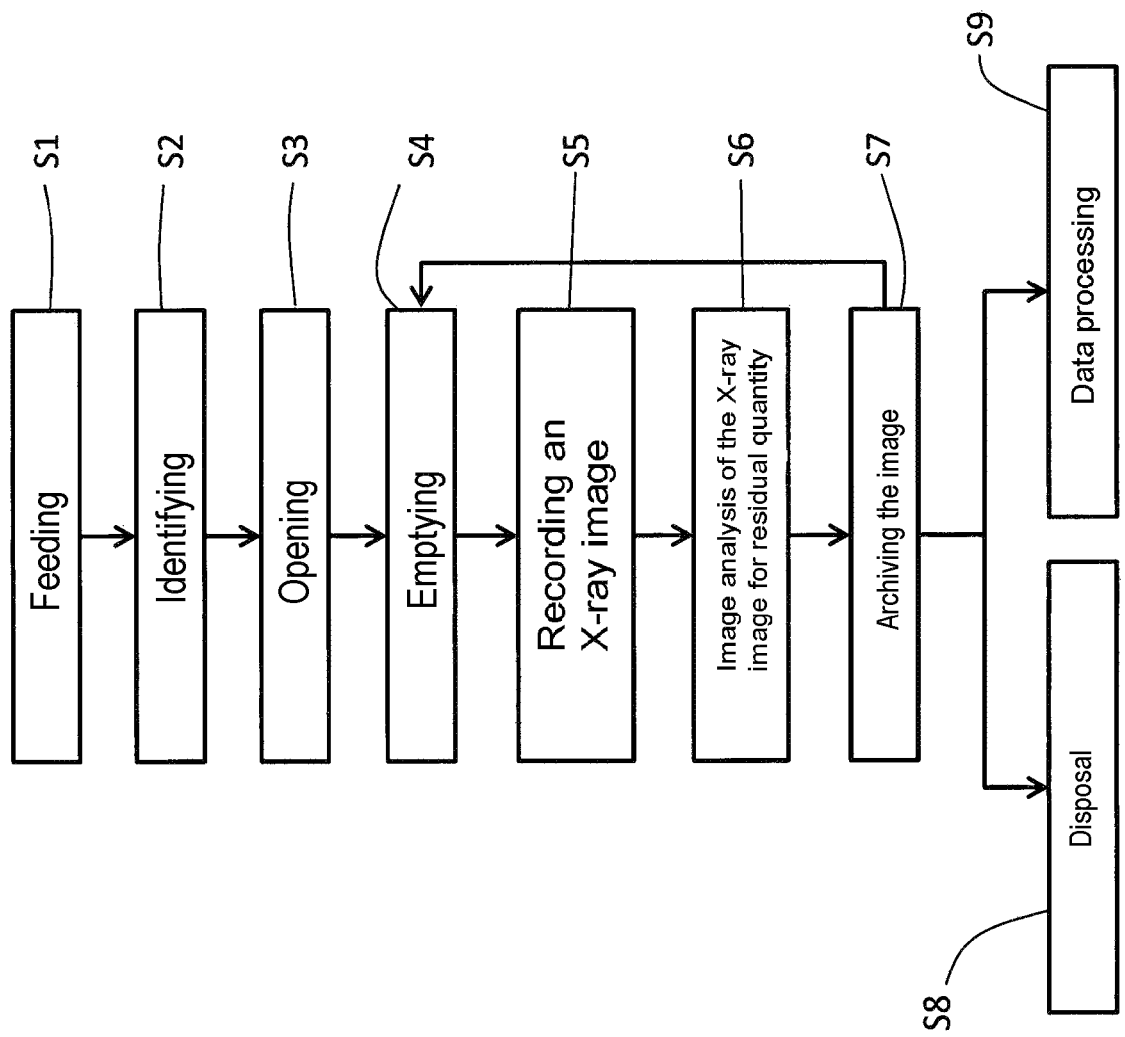
FIG. 1 a schematic flowchart of a method according to the invention.

In the following exemplary embodiments, a transport container for receiving and transporting objects of value is described. For the purpose of simplification, the objects of value are mostly cash, usually banknotes and/or coins. Within the scope of the invention, the exemplary embodiments are not restricted exclusively to banknotes and/or coins. Rather, at the same time every further value document, such as, for example, credit card, identity document and/or ticket, is to be implied. In order to further simplify the readability and recognizability of the invention, functionally identical and/or similar components are identified by the same reference numerals.

FIG. 1 represents schematically steps of a sequence scheme of a method for processing transport containers for objects of value, in particular for emptying the transport containers.

In a first step S1, the transport container is fed to a system for processing the transport container, in particular the content thereof. The transport container is preferably a flat, bag-shaped, sealable transport container. Such transport containers are also called "safebags". Said transport containers are particularly suitable for transporting sheet-shaped objects of value, for example banknotes, and coins. Instead of a bag-shaped transport container, said container can also be configured with a substantially rigid housing.

The transport container is identified by the system in a step S2. For example, a coding on the transport container is captured by the system and compared with a background system. In addition, the transport container is logged into the system and a sequence number is preferably allocated to the transport container. The transport container is subsequently opened in a step S3. The transport container is preferably severed, for example with a cutting apparatus. After the transport container has been opened, it is emptied in a step S4. The content of the transport container is fed to a sorting apparatus, for example.

After the transport container has been emptied, the transport container is examined for a residual quantity. Therein the transport container is irradiated with electromagnetic radiation, for example by means of X-radiation, and a transmission image, in the present case an X-ray image, is recorded (step S5). The recorded transmission image is analyzed and evaluated with regard to the residual quantity (step S6). Depending on the technology employed, for example X-radiation or infrared radiation, a detected residual content can be analyzed with regard to the type of residual content, so that, for example, it is detected whether coins, banknotes, value papers, tickets and/or other objects, for example a clip, are located in the transport container. Further, in a step S7, the transmission image is archived with reference to the identified transport container, for example on a server.

If the evaluation from step S6 yields that the transport container has not yet been completely emptied, i.e. a residual quantity is still contained, the transport container is fed to the sequence starting with step S4, the emptying of the transport container. A manual processing can also be added and/or take place here, for example the further opening of the container and/or manual emptying of the container.

If the evaluation from step S6 yields that there is no residual content present in the transport container, the transport container is preferably disposed of (step S8). The disposal can be carried out, for example, by a shredder or by compressing the transport container, wherein preferably it is to be ensured that the transport container is no longer reused. Alternatively and/or additionally, the transport container, in particular its identification feature, can be logged out by a superordinate system, such that the transport container is no longer available or employable at least temporarily, at least until its reactivation. In particular when transport containers with a hard shell are employed, for example a cash box, a reuse is preferred.

To the digital entry relating to the transport container, for example in a digital archive, there can be added, for example in step S9, the result of the sorting by means of further data processing.

Figure 2:
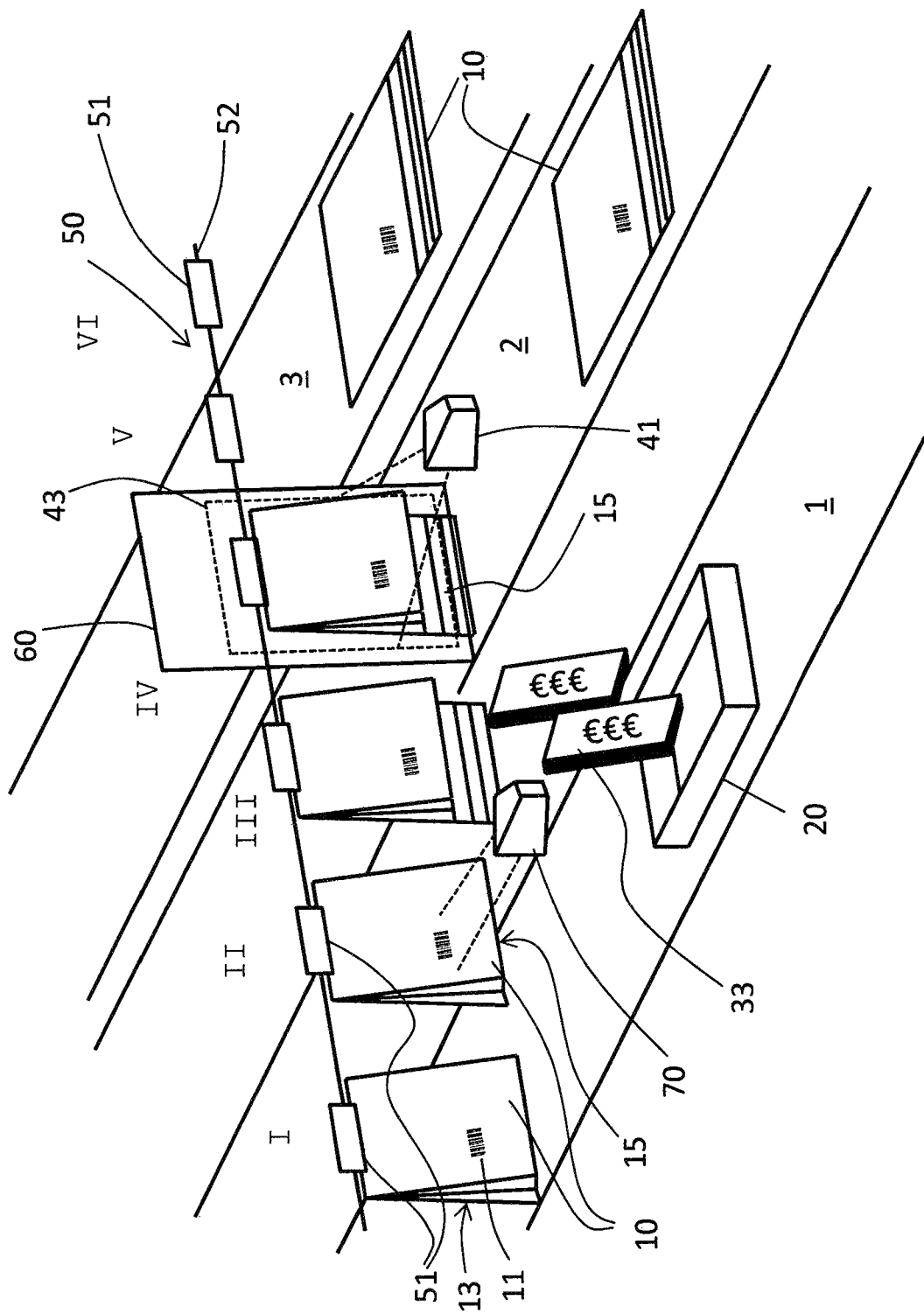
FIG. 2 a schematic embodiment of an apparatus for processing transport containers for objects of value.

FIG. 2 represents an apparatus for the automated processing of a transport container 10 with objects of value 30 according to the invention. In the present example, the transport containers 10 are transport bags, so-called safebags. Further, a cash bundle is shown as an object of value 30 by way of example. Of course, the object of value 30 can also represent other valuable objects, such as for example a ticket, identity card and the like.

A transport apparatus 50 for transport containers 10 comprises a transport belt 52 in the present case with reference to FIG. 2. Several receiving means 51 are arranged on the transport belt 50. In FIG. 2, the receiving means 51 are configured as clamping devices by way of example. The receiving means 51 fixates the transport container 10 to the transport belt 52.

The transport container 10 is transported to different processing stations by means of the transport belt 52. In FIG. 2 six different processing situations (I-VI) are represented according to processing stations. The representation is purely schematic and not true to scale. In addition, further steps and apparatus can be interposed between the processing situations.

In the processing situation I, the transport container 10 is arranged at the receiving means 51. The transport container 10 has an identification feature 11, for example a bar code. The transport container is arranged at the receiving means 51 such that the identification feature 11 points to a defined direction, namely in the present case forward, in the direction of the viewer.

In the processing situation II, the identification feature 11 configured as a bar code is read by means of a bar code scanner 70. The bar code scanner 70 transfers the identification feature 11 to a server, after which the identified transport container 10 is entered or logged in on the transport belt according to its clocking.

In the processing situation III, the transport container 10 is opened. Here, the transport container 10 is partially cut open by means of a cutting apparatus (not shown). This means that in the present case, merely the front side 12 of the transport container 10 is cut, so that the bottom-forming area 15 folds away above the back side 13 of the transport container 10 and, instead of the bottom-forming area 15, the transport container 10 has an opening on its lower side. The content of the transport container 10 can drop into a collection container 20 via the opening. The collection container 20 is transported on a first conveyor belt 1 for processing the content, in the present example banknotes 33. Several collection containers 20 are preferably transported with the conveyor belt 1 in a manner matching the clocking of the transport containers 10 on the transport apparatus 50, so that after each cutting open of the transport container 10, a transport container 10 is available and receives the content of the transport container 10.

After the transport container 10 has been opened and emptied, the transport container 10 is fed to the processing situation IV. Here, electromagnetic radiation 43 is applied to the transport container. In the present example, a transmitting unit 41 emits X-radiation in the direction of the transport container 10. On the side of the transport container 10 opposite the transmission unit 41 a developing unit 60 is arranged, with which a transmission image of the transport container is recorded. The transmission image is fed to an analysis unit. The analysis unit ascertains from the transmission image whether the transport container 10 has been completely emptied, i.e. whether residual quantity is still contained. For the case in which the analysis of the transmission image of the transport container 10 yields that the latter has been completely emptied and accordingly no residual quantity is contained, the transport container 10 is transferred to a second conveyor belt 2 in a processing situation V. For this purpose, the receiving means 51 releases the connection to the transport container 10, so that the latter is taken over by the second conveyor belt 2. Via the second conveyor belt 2, the emptied transport container 10 is fed to an apparatus for the further processing of the transport container, for example its disposal or recycling.

If the analysis of the transmission image of the transport container 10 yields that the latter has not been completely emptied, the transport container 10 is fed to a repeated emptying operation in a processing situation VI. In the present exemplary embodiment, the transport device 50 transfers the not completely emptied transport container 10 to a third conveyor belt 3. The third conveyor belt 3 transports the transport container 10 to a reject compartment, after which a manual check and emptying of the transport container 10 follows. The emptied objects from the transport container are allocated to the identity of the identified transport container 10. Subsequently, the transport container 10 is again checked for emptying by means of electromagnetic radiation and analysis of a recorded transmission image and, when the complete emptying has been ascertained, is forwarded for further processing according to the second conveyor belt 2. In order to record the transmission image, the transport container can, for example, be fed back to the transport device 50, for example directly to the processing situation IV. Instead of a manual check and emptying, this can also be effected in an automated manner.

Even if the second and third conveyor belts 2, 3 are employed in the exemplary embodiment according to the processing situations V and VI, these can also be present in combined form as one conveyor belt. The processing of the transport container 10 is effected, for example, on the basis of the analysis result of the transmission image. This means that a switch on the conveyor belt can be driven accordingly, which guides the transport container 10 to a reject compartment or which disposes of the transport container 10, for example.

The bar code scanner 70 and the developing unit 60 are connected to the server via a data communication interface. The server monitors the speed of the transport apparatus 50 and/or of the first, second and/or third transport belt 1, 2, 3. Further, the server also controls the optionally present switch for a reject of the transport container 10. The analysis unit preferably ascertains not only the presence of residual quantity in the transport container, but also determines the residual content, for example the object, currency and/or the value. In this case, the analysis unit could examine the transmission image for prominent elements represented, for example with regard to a security strip, a printing and/or other indications. Further, the analysis unit can detect whether objects of value or only waste products are actually present in the transport container, such as, for example, a paper clip, wherein a reject (output of the transport container due to an incorrect check and an analysis result that a residual quantity is still contained in the transport container) and repeated emptying is effected only in the case of a residual content of objects of value and, in the case of a residual content of waste products, no reject and thus preferably a disposal of the transport container is effected.

Figure 3:
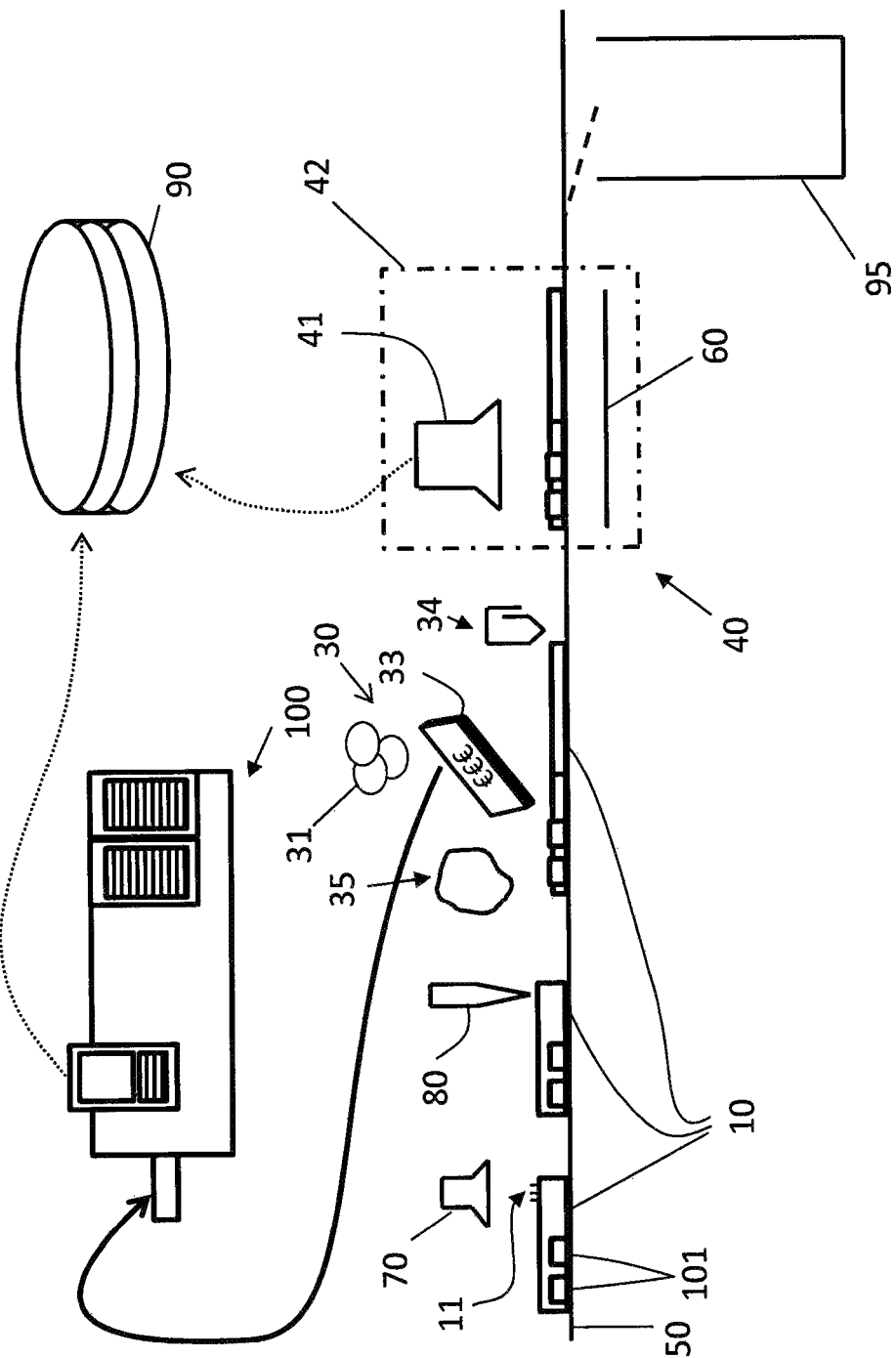
FIG. 3 a further schematic embodiment of an apparatus for processing transport containers for objects of value.

FIG. 3 shows a further exemplary embodiment according to the invention. A transport container 10 is transported resting on a transport belt 50 in an apparatus for processing transport containers 10. The transport container has an identification element 11. The identification element 11 is read in by a sensor 70. The transport container 10 is logged in by exchanging data with a background system, for example a server. In a further step, the transport container 10 is opened. The transport container 10 in the present exemplary embodiment is a so-called multibag. A multibag is a transport container 10 in which further sub-transport containers 101, for example safebags, are contained. By identifying the transport container 10, it is known to the apparatus and/or an operator that the transport container 10 is not a safebag, but a multibag. Accordingly, after the transport container 10 has been opened, the further sub-transport containers 101 are likewise identified and opened by means of a cutting apparatus 80.

After the opening, the content of the sub-transport containers 101 and of the transport container 10, but not the sub-transport containers 101 themselves, are fed to a processing apparatus 100 for further processing. The transport container and the sub-transport containers 101 are thus emptied. For example, the processing apparatus 100 is a sorting and separating apparatus. There, the content, for example banknotes, coins, images, rubber band, paper clip and/or paper slip are separated from each other. The respective objects of value 30 such as banknotes 33 and/or coins 31 are preferably fed to a money processing machine for counting and/or for checking authenticity; the other objects, such as the paper clip 34 and the rubber band 35, are fed to a collection container, preferably to the recycling thereof, or to waste.

After the transport container 10 has been emptied, the transport container 10 and the sub-transport containers 101 are fed to an apparatus for checking for emptying 40. The apparatus for checking for emptying comprises a housing 42. In the housing 42 there is arranged a transmitting unit 41 for emitting electromagnetic rays, for example in the infrared spectrum or X-ray spectrum. Further, a developing unit 60 or so-called sensor unit in the form of a sensor is arranged in the housing 42. The developing unit 60 and the transmitting unit 41 are arranged such that the transport container 10 and/or the sub-transport containers 101 can be arranged therebetween, whereby the developing unit 60 records a transmission image of the transport container 10 and/or sub-transport containers 101.

The sensor 70 and the apparatus for checking for emptying 40 are connected to a server 90 via a data communication interface. The transmission image is stored on the server 90 in connection with the entry for the identified transport container 10. On the basis of the transmission image, an analysis unit, for example a detection software on the server 90, determines whether a residual quantity, i.e. a residual content, is present in the transport container 10 and/or the sub-transport containers 101, and optionally what kind of residual content is present. If the analysis yields that residual content is still present, which is also an object of value, the transport container 10 or the sub-transport containers 101 is/are fed to a reject compartment. In this case, the transport container 10 or the sub-transport containers 101 can be fed back to the transport belt 50, so that the transport container 10 or the sub-transport containers 101, respectively, are again or further opened and emptied. However, when it is detected that no residual content is present with objects of value, the transport container 10 or the sub-transport containers 101 are fed to a shredder 95.

Figure 4:
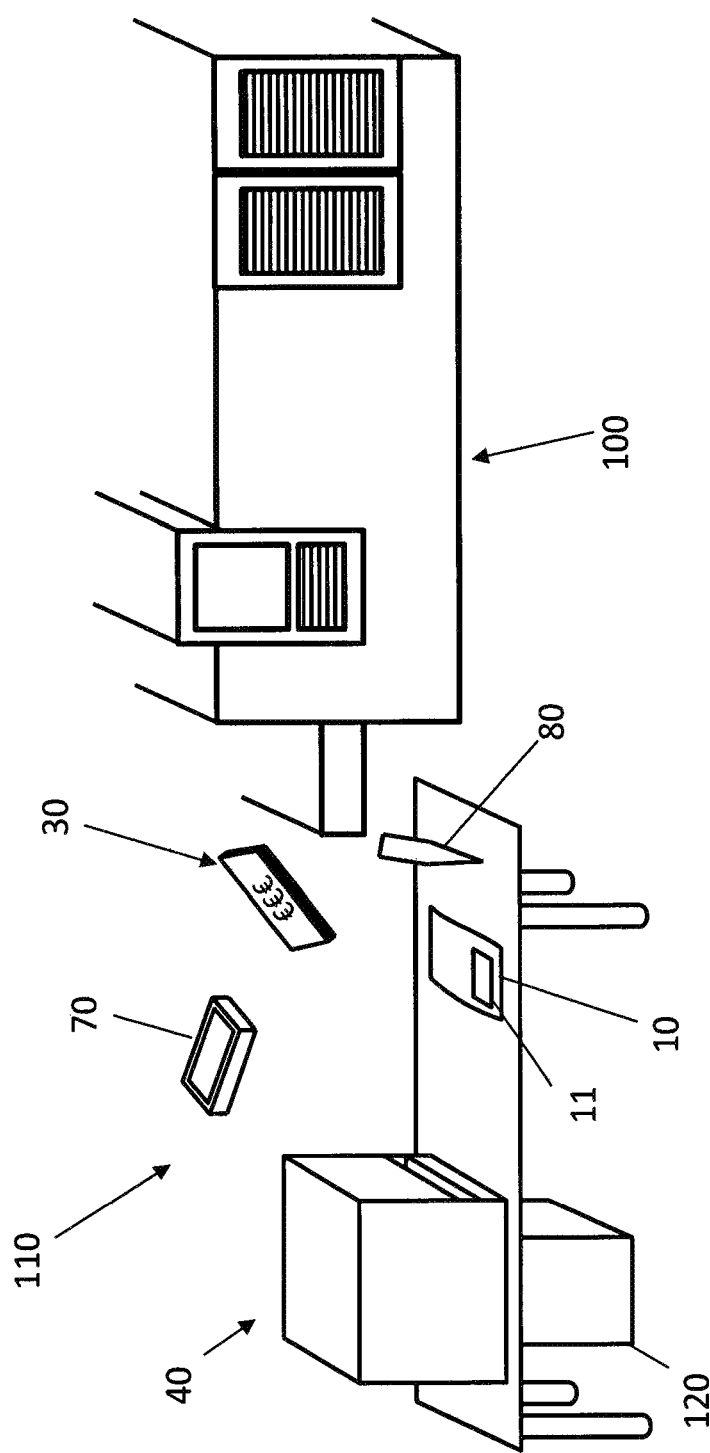
FIG. 4 a further schematic embodiment of an apparatus for processing transport containers for objects of value.

Even if the embodiments shown in FIGS. 1 to 3 are represented and described for the automatic processing of transport containers 10, these steps can also be carried out manually at least partially. Thus, FIG. 4 shows an example of a workstation 110 for processing transport containers 10 for objects of value 30.

For processing transport containers 10, i.e. the emptying thereof, and further processing of the transport container 10 and its content, the transport container 10 is fed to the workstation 110. An operator scans an identification element 11 on the transport container 10 with the aid of a scanning apparatus 70. The scanning apparatus 70 is preferably configured for optical capture of the identification element 11 and can be, for example, a bar code reader, a smart phone, a tablet PC and/or another optical capturing apparatus. In principle, an identification of the transport container 10 by means of RFID technology would also be conceivable, wherein the transport container 10 has correspondingly an RFID transponder. With the aid of the capture of the identification element 11, a background system is informed of the identification of the transport container 10, in particular that the transport container 10 is located and processed at this workstation.

Further, the operator opens the transport container 10 with a cutting apparatus 80, for example by means of a cutter knife or suction knife 80. The suction knife 80 generates a vacuum at a blade of the suction knife 80, so that a bag-type transport container 10 is slit open only at a wall adjacent to the suction knife 80, but the content of the transport container 10 remains intact. For this purpose, the cutting depth of the suction knife 80 is matched to the thickness of the wall of the transport container 10.

The operator removes the content of the transport container 10, in the present example a bundle of banknotes 33 as the object of value 30, and transfers the bundle to a banknote processing apparatus 100. The banknote processing apparatus 100 is likewise connected to the background system, so that an ascertained monetary amount of the bundle is booked according to the identified transport container 10, for example to an account of a sender of the transport container 10. Further, the amount is registered in a database in connection with the transport container 10. In addition, further data, for example degree of fitness, serial number and/or statistical distribution of the captured banknotes 33, can be stored in connection with the database entry of the transport container 10 and/or its identification.

The operator further transfers the opened transport container 10 to an apparatus for checking for emptying 40. For this purpose preferably the apparatus for checking for emptying 40 has a feeder, for example a roller pair. The apparatus for checking for emptying 40 applies electromagnetic radiation to the transport container 10, for example infrared radiation and/or X-radiation, and produces a transmission image. The transmission image is sent to and stored in the database entry of the transport container 10 via a data connection. An image processing unit detects from the transmission image whether the transport container 10 is actually empty, has a residual quantity or is considered as emptied. It is preferably detected whether further objects of value are still present in the transport container 10, such as a banknote, coins, tickets and/or value papers.

In the event that a residual quantity, in particular objects of value, are still present in the transport container, the apparatus for checking for emptying 40 outputs an indication and returns the transport container 10 to the workstation or operator. This means that the transport container 10 is not released and is considered as a reject. The apparatus for checking for emptying 40 outputs the transport container 10 again. The operator thus has the task to optionally open the transport container 10 further and empty it again and, in particular, to forward the emptied monetary content, for example to the banknote processing apparatus 100. The operator subsequently transfers the transport container 10 again to the apparatus for checking for emptying 40.

For the case that the transmission image yields that no residual content, in particular no objects of value, is contained in the transport container 10, the apparatus for checking for emptying 40 forwards the transport container 10 to a secured container 120 for disposal. The secured container 120 serves as a receiving device for collecting used transport containers 10, so that said containers are disposed of.

Figure 5:
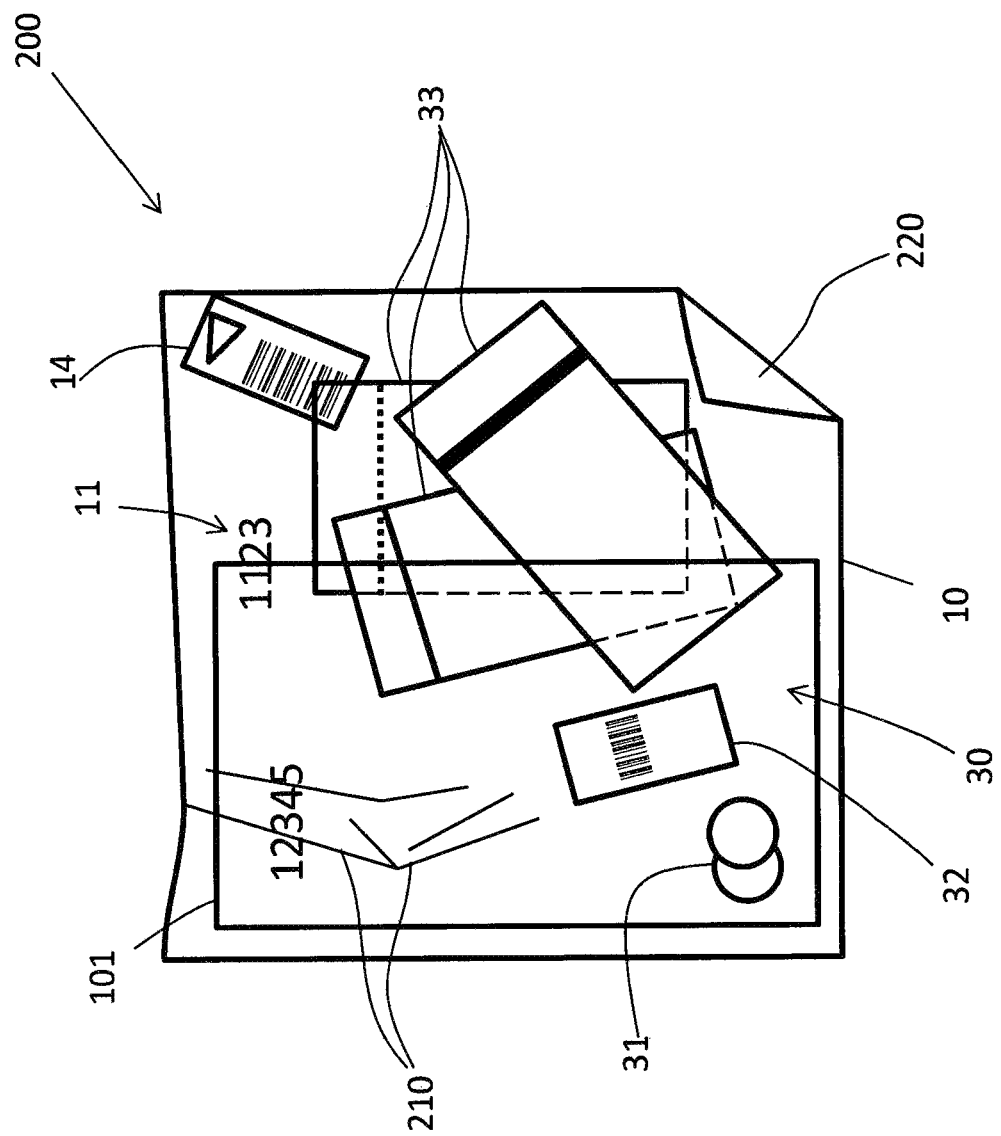
FIG. 5 a schematic exemplary representation of a transmission image.

FIG. 5 shows a representation of a possible transmission image 200. The transmission image 200 shows a pocket-shaped transport container 10, for example a safebag. The transport container 10 has an identification element 11 on its outer wall. The identification element 11 serves for the identification of the transport container 10 by a person and/or with the aid of a reading device. The identification element 11 can be supplied as a label or as a printed field. In addition, the identification element 11 can be machine-produced and/or have a manual inscription. The identification element 11 can contain data relating to the transport container 10, in particular a unique identity and content information, such as, for example, the value of the content, the customer, the destination of the transport and/or transport or processing instructions. In the present case, the identification element 11 comprises a number "1123".

On account of its bag-shaped nature and, possibly, the filling, the transport container 10 has kinks 210 on its wall during the recording of the transmission image 200. These kinks 210 are detectable in the transmission image 200 as a material compression. Further, in the transmission image 200 a folding 220 of the transport container 10 in the form of a dog's-ear can be detected. This folding 220 in the form of a dog's-ear is likewise represented as a material compression.

Several objects of value 30 are contained in the transport container 10. On the one hand, several banknotes 33, a voucher 32 and coins 31 can be detected. Further, the transport container 10 comprises a sub-transport container 101, which can itself comprise objects of value 30. In the present transmission image 200, it is not possible to detect whether, for example, the coins 31 or the voucher 32 are contained in the sub-transport container 101 or are disposed at least partially above one another with respect to the sub-transport container 101. However, an identity of the sub-transport container 101, in the present case "12345", can be detected from the transmission image 200.

Further, in the transmission image 200 an information card 14 can be seen, which likewise has data for identifying the transport container 10. If the illustrated transmission image 200 according to the invention is recorded after the emptying, residual content is clearly still present.

To evaluate the transmission image 200, a machine-assisted image evaluation is preferably employed. For this purpose, the transmission image 200 is processed in particular with a filter, for example a noise filter and contrast filter. In particular, contours are to be clearly represented. In the evaluation of the contours and compressions, for example, individual denominations can be determined by detecting security strips, in particular their printed data, as well as the dimensioning of banknotes 33 and coins 31. In addition, contour detection algorithms can be used to display and analyze the transmission image 200.

For capturing and archiving the transmission image 200, it is particularly advantageous when the identification element 11 and/or the information card 14 is inscribed with an ink that is suitable according to the type of recording of the transmission image 200. Thus, in the case of an infrared transmission image, a heat-absorbing and/or heat-reflecting inscription ink could be used. Further, when employing X-rays, an X-ray absorbing ink could be used. The information of the identification element 11 and/or the information card 14, in particular an allocation of the transmission image 200 to the transport container 10, would already be detectable from transmission image 200. Preferably, at least the identification element 11 and/or the information card 14 are partially inscribed with machine-readable ink.

To evaluate the transmission image 200, a list could be stored, as a result of which specific objects are not identified as an object of value 30. For this purpose, the evaluation could identify a residual quantity in the transport container 10 as a paper clip which is not counted as an object of value 30. A disposal of a paper clip could be considered as not disturbing with regard to the operating sequence and the monetary processing of the transport container 10. In such a case, the paper clip remains in the emptied transport container 10 and the transport container 10 is not output for repeated emptying and checking or a residual quantity.

The transport container 10 is preferably formed from a material transparent to the transmission irradiation, for example polypropylene or polyethylene.

The invention claimed is:

1. A method for processing a transport container for objects of value, comprising the steps of:
   feeding the transport container to an apparatus for processing the transport container;
   severing the transport container in the apparatus;
   emptying of the objects of value from the transport container; and
   checking the transport container for a residual quantity, wherein electromagnetic radiation is applied to the transport container;

a transmission image of the transport container is produced by means of the electromagnetic radiation; and the transmission image is analyzed, wherein the residual quantity in the transport container is deduced from the analysis;

wherein the transport container is arranged in a housing during the application of the electromagnetic radiation to the transport container, said housing having an at least partially radiation-absorbing and/or radiation-emitting inner walk wherein the inner wall at least partially generates a defined ambient radiation to the transport container.

2. The method according to claim 1, wherein the electromagnetic radiation comprises a spectrum of infrared light, x-radiation, visual light and/or in the terahertz radiation range.

3. The method according to claim 1, wherein when the check of the transport container yields that said container is considered as emptied, the transport container is disposed of, comminuted and/or compressed.

4. The method according to claim 1, wherein when the check of the transport container yields that said container has not been completely emptied, the steps of emptying and checking and of the preceding severing are executed again.

5. The method according to claim 1, further comprising a step of identifying the transport container.

6. The method according to claim 1, wherein the transmission image of the transport container is archived electronically.

7. The method according to claim 1,
wherein the transport container is arranged between a sensor and a transmitting element which emits a defined electromagnetic radiation.

8. The method according to claim 1, wherein transport container has a bag shape and the method comprises the step of checking the transport container for folds for kinks and/or for folded-over areas.

9. The method according to claim 1, wherein in one step the transport container is unfolded and/or smoothed.

10. An apparatus for processing a transport container for objects of value, comprising
a receiving device for receiving the transport container,
a device for severing the transport container,
a device for emptying of the transport container, and
an apparatus for checking the transport container for residual quantity;
wherein the apparatus for checking the transport container for residual quantity comprises a sensor device for capturing a transmission image of the transport container and an analysis unit for analyzing the transmission image; and
wherein the apparatus for checking the transport container for residual quantity has a housing and/or a background element the housing and/or the background element at least partially comprising an electromagnetic radiation-absorbing region and/or an electromagnetic radiation-emitting region, wherein the electromagnetic radiation absorbing region and/or the electromagnetic radiation-emitting region are configured to generate a defined basic radiation.

11. The apparatus according to claim 10, wherein the apparatus for checking the transport container for residual quantity further comprises a transmitting device for emitting electromagnetic radiation in the spectrum of x-radiation and/or in the spectrum of terahertz radiation, wherein the sensor device is configured in accordance with the spectrum of the transmitting device.

12. A system for processing a transport container for documents of value, comprising an apparatus according to claim 11, and at least one further apparatus for processing the objects of value, for sorting, counting and/or checking the objects of value.

13. The system according to claim 12, wherein the system has a device for the disposal of the transport container for recycling, comminuting and/or compressing.

14. The system according to claim 12, further comprising a digital archive for archiving the transmission image,
wherein the apparatus for checking the transport container for residual quantity is connected to the digital archive by means of a data connection.

* * * * *